US008219840B1

(12) United States Patent
Nanda et al.

(10) Patent No.: US 8,219,840 B1
(45) Date of Patent: *Jul. 10, 2012

(54) EXITING LOW-POWER STATE WITHOUT REQUIRING USER AUTHENTICATION

(75) Inventors: Sameer Nanda, San Jose, CA (US); David James, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,833

(22) Filed: Sep. 27, 2011

Related U.S. Application Data

(63) Continuation of application No. 12/891,462, filed on Sep. 27, 2010.

(60) Provisional application No. 61/356,642, filed on Jun. 20, 2010.

(51) Int. Cl.

| | |
|---|---|
| ***G06F 1/32*** | (2006.01) |
| ***G06F 21/00*** | (2006.01) |
| ***G06F 1/00*** | (2006.01) |
| ***G06F 7/04*** | (2006.01) |
| ***G06F 12/14*** | (2006.01) |

(52) U.S. Cl. ........ 713/320; 713/182; 713/183; 713/300; 713/323; 726/2; 726/16

(58) Field of Classification Search ........................ None
See application file for complete search history.

(56) References Cited

U.S. PATENT DOCUMENTS

| | | | | |
|---|---|---|---|---|
| 5,752,044 | A * | 5/1998 | Crump et al. | 713/323 |
| 5,875,345 | A * | 2/1999 | Naito et al. | 713/323 |
| 6,121,962 | A * | 9/2000 | Hwang | 345/211 |
| 6,401,209 | B1 * | 6/2002 | Klein | 726/34 |
| 6,466,781 | B1 * | 10/2002 | Bromba et al. | 455/411 |
| 2003/0074590 | A1 * | 4/2003 | Fogle et al. | 713/320 |

OTHER PUBLICATIONS

"Advanced Configuration and Power Interface Specification", Hewlett-Packard Corporation, Intel Corporation, Microsoft Corporation, Phoenix Technologies Ltd., Toshiba Corporation, Revision 4.0a, Apr. 5, 2010, 731 pages.

* cited by examiner

*Primary Examiner* — Ji H Bae
(74) *Attorney, Agent, or Firm* — Brake Hughes Bellermann LLP

(57) ABSTRACT

A method may include, in response to an idle time of a computing device meeting or exceeding a power-save time threshold value, placing the device into a low-power state; in response to receiving an input to the device after the device has been placed into the low-power state, exiting the low-power state; determining whether the idle time meets or exceeds a lockout threshold value; after having exited from the low-power state, if the idle time meets or exceeds the lockout threshold value, requiring a user to perform a successful predetermined authentication to the device before allowing the user to access applications in the device; and if the idle time does not meet or exceed the lockout threshold value, allowing the user to access applications in the device without requiring the user to perform the successful predetermined authentication to the device.

29 Claims, 4 Drawing Sheets

Output Module 114

Please enter your password:

EXITING LOW-POWER STATE WITHOUT REQUIRING USER AUTHENTICATION

CROSS REFERENCE TO RELATED APPLICATIONS

This application is a continuation of, and claims priority under 35 U.S.C. §120 to, U.S. application Ser. No. 12/891,462, filed Sep. 27, 2010, entitled, "Exiting Low-Power State Without Requiring User Authentication," which claims the benefit of, under 35 U.S.C. §119, U.S. Provisional Application No. 61/356,642, filed on Jun. 20, 2010, entitled, "Exiting Low-Power State Without Requiring User Authentication." The disclosures of both of the above-referenced applications are hereby incorporated by reference.

TECHNICAL FIELD

This description relates to power-saving techniques in computing devices.

BACKGROUND

Conserving power and increasing battery life can be important in electronic devices, such as mobile devices and/or in devices that typically or often are not connect to an electrical power grid and rather are powered by a stored energy source, such as a battery. Electronic devices may enter a low-power state after a period of non-use, sometimes referred to as "idle time." Entering the low-power state may allow the electronic devices to conserve battery power. However, the low-power state may provide an interruption to the user experience when the user desires to resume use of the device.

SUMMARY

According to one general aspect, a method may include, in response to an idle time of a computing device meeting or exceeding a power-save time threshold value, placing the computing device into a low-power state; in response to receiving a second input to the computing device after the computing device has been placed into the low-power state, exiting the low-power state; determining whether the idle time meets or exceeds a lockout threshold value that is greater than the power-save time threshold value; after having exited from the low-power state, if the idle time meets or exceeds the lockout threshold value, requiring a user to perform a successful predetermined authentication to the computing device before allowing the user to access applications in the computing device; and if the idle time does not meet or exceed the lockout threshold value, allowing the user to access applications in the computing device without requiring the user to perform the successful predetermined authentication to the computing device.

According to another general aspect, a computing device may include a clock configured to maintain a current time and provide the current time to other modules in the computing device, a user input module configured to receive input from a user, a memory configured to store data, instructions executable by a processor, and states of the computing device, a processor configured to execute the instructions stored on the memory, and a controller. The controller may be configured to place the computing device into a low-power state in response to an idle time meeting or exceeding a power-save time threshold value; remove the computing device from the low-power state in response to the user input module receiving a second input after entering the low-power state; determine whether the idle time since removing the computing device from the low-power state meets or exceeds a lockout threshold value, the lockout time exceeding the power-save time threshold value; if the idle time since removing the computing device from the low-power state meets or exceeds the lockout threshold value, requiring a user to perform a successful predetermined authentication to the computing device before allowing the user to access applications in the computing device; and if the idle time since removing the computing device from the low-power state does not meet or exceed the lockout threshold, allowing the user to access applications in the computing device without requiring the user to perform the successful predetermined authentication to the computing device.

According to another general aspect, a non-transitory, computer readable storage medium may comprise computer executable code stored thereon that, when executed by at least one processor, is configured to cause the at least one processor to at least, in response to an idle time of a computing device meeting or exceeding a power-save time threshold value, place the computing device into a low-power state; in response to receiving a second input to the computing device after the computing device has been placed into the low-power state, exit the low-power state; determine whether the idle time meets or exceeds a lockout threshold value that is greater than the power-save time threshold value; after having exited from the low power state, if the idle time meets or exceeds the lockout threshold value, require a user to perform a successful predetermined authentication to the computing device before allowing the user to access applications in the computing device; and if the idle time does not meet or exceed the lockout threshold value, allow the user to access applications in the computing device without requiring the user to perform the successful predetermined authentication to the computing device.

The details of one or more implementations are set forth in the accompanying drawings and the description below. Other features will be apparent from the description and drawings, and from the claims.

DETAILED DESCRIPTION

Figure 1:
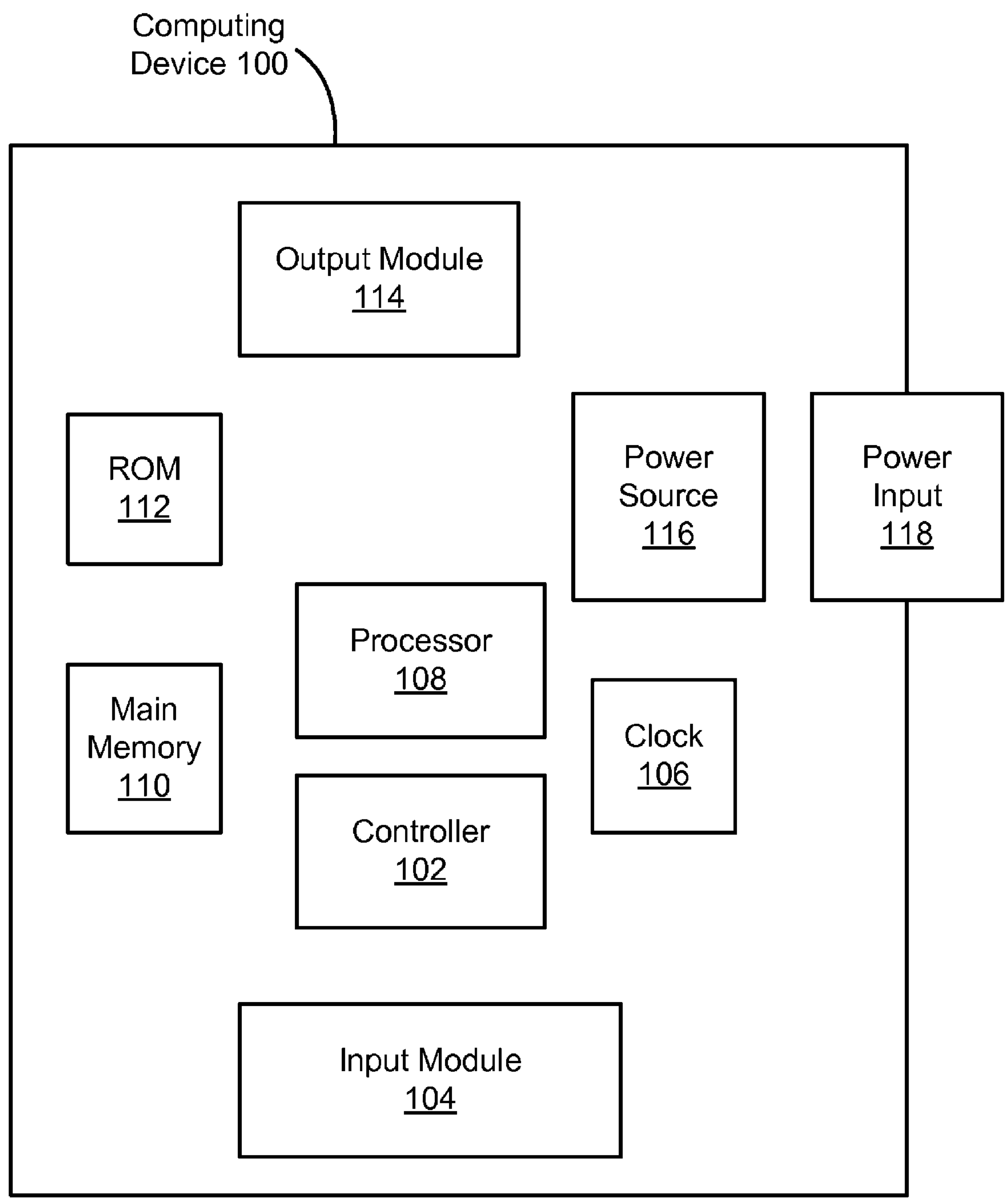
FIG. 1 is a block diagram of a computing device according to an example embodiment.

FIG. 1 is a block diagram of a computing device 100 according to an example embodiment. The computing device 100 may include, for example, an integrated circuit, a processor, a personal computer, a laptop, a netbook, a thin client, notebook computer, a tablet computer, a smartphone, a personal digital assistant (PDA), a cellular phone, or other computing device capable of executing instructions. The computing device 100 may perform operations according to instructions. The computing device 100 may receive input from, and provide output to, a user and/or other computing devices. The computing device 100 may determine and/or measure a time since receiving last input. The computing device 100 may power down and go into a low-power state after a certain period of time (e.g., a low-power threshold time), has passed without the computing device 100 receiving an input.

Powering down the computing device 100 may save power, but may interrupt a user's experience with the computing device 100. Thus, it may desirable to allow a user to quickly resume using the computing device 100 in a full power (or normal) state after the computing device 100 has been powered down.

In an example embodiment, for security reasons, the computing device 100 may lock the user out of using the device 100 after a certain time period (e.g., a lockout threshold) has passed. For example, if the computing device 100 has not received input during the lockout threshold time, it may surmised that the user has left the device such that another person could gain access to the computing device 100 and the data stored thereon or accessible therefrom. Thus, after the idle time meets or exceeds the lockout threshold value, the computing device 100 may lockout users and require the user to authenticate himself to the device before allowing a user to access the computing device 100. One example of locking out the user from using the device 100 may include invoking a screen locker. The screen locker is discussed further with reference to FIG. 3. Requiring authentication to use the computing device 100 can be frustrating to a user who wishes to access the device after not providing input to the computing device 100 for a time greater than the lockout threshold.

In an example embodiment, the lockout threshold is greater than the power save time threshold. In this example, if the idle time (e.g., as measured as a time since the last input received by the computing device) exceeds the power-save threshold value, the computing device 100 enters a low-power state. Upon receiving a second input, after the last input, the computing device 100 exits the low-power state and enters the normal power state. At this point, if the idle time between the last input and the second input is less than the lockout threshold, then when the computing device 100 exits the low-power state, the computing device 100 does not require the user to authenticate himself or herself to the computing device 100, and the user may proceed to use the device 100. However, if the idle time between the last input and the second input exceeds the lockout threshold, then when the computing device 100 exits the low power state, the computing device 100 may require the user to perform successfully a predetermined authentication technique before allowing the user to use the computing device further.

One or more low-power states of the computing device 100 may exist. In one implementation, low-power states of the computing device 100 may be defined with reference to the Advanced Configuration and Power Interface (ACPI) specification. The ACPI specification provides an open standard for unified operating system-centric device configuration and power management, and was published as "Revision 4.0a," on Apr. 5, 2010, at www.acpi.info/DOWNLOADS/ACPIspec40a.pdf.

For example, a low-power state of the computing device 100 may be referred to as "Standby," "Sleep," or "Suspend to RAM" or "Suspend." In such a low-power state, aside from powering the random access memory ("RAM") that is required to restore the computing device's 100 state, the computing device 100 attempts to reduce or cut power to all unneeded parts of the machine (e.g., the hard disk(s) stop spinning, the display device is placed into a dark or low-power state, and peripheral devices are de-powered). Such a low-power state often is called Stand By (for computing devices running a Microsoft Windows 95—Server 2003 operating system), or is called Sleep (for computing devices running an Apple operating system or a Windows Vista, Windows 7, Windows Server 2008 operating system), or Suspend (for computing devices running a Linux operating system). In such a state, the processing functions of the computing device 100 are powered down, and some small amount of power is used to preserve the contents of RAM and support waking up the computing device from the low-power state into the normal or full power state. When the computing device 100 is placed into the Standby, Sleep, or Suspend to RAM state, it typically consumes less than about 20% of the total power than is consumed with the device 100 is in the normal or full power mode.

In another example implementation, a low-power state of the computing device 100 may be referred to as "Hibernate," "Safe Sleep," or "Suspend to Disk." In such a state the contents of the computing device's 100 RAM are written to non-volatile storage such as a hard disk, as a file or on a separate partition, before powering off the computing device 100. When the computing device 100 is restarted it reloads the data that had been written to the non-volatile memory and is restored to the state it was in when hibernation was invoked. To enable hibernation, the hard disk must have sufficient free space to store all non-replaceable contents of RAM.

Such a low-power state often is called Hibernate (for computing devices running a Microsoft Windows 95—Server 2003 operating system), Fast Sleep (for computing devices running a Microsoft Vista operating system), Safe Sleep (for computing devices running an Apple operating system), or Suspend to Disk (for computing devices running a Linux operating system). When the computing device 100 is placed into the Hibernate, Safe Sleep, or Suspend to Disk state, it typically consumes about as much power as is consumed when the device is powered off.

The computing device 100 may include an output module 114. The output module 114 may provide output to a user and may include, for example, a display or monitor capable of providing video or audiovisual output to the user, a speaker capable of providing audio output to a user, or other type of output device. The output module 114 may consume a significant amount of power, and may be powered off or down while the computing device 100 is in the low-power state. Placing the output module 114 in a low-power state may help to conserve power in the computing device 100.

The computing device 100 may also include a power source 116. The power source 116 may include, for example, a rechargeable battery. Placing the computing device 100 into the low-power state may reduce power consumption from the power source 116. The computing device 100 may also include a power input 118. The power input 118 may include, for example, an input for a power cord. The power input 118 may receive power from outside sources, such as a wall socket. The power input 118 may be coupled to the power source 116, and the power input 118 may provide power to the power source 116, allowing the power source 116 to recharge.

The computing device 100 may include a controller 102. The controller 102 may control power to various modules and components within the computing device 100. The controller 102 may also control the power state of the computing device 100 and may determine whether the computing device 100, and/or any component or module of the computing device 100, enters a low-power state.

The controller 102 may receive input from an input module 104. The controller 102 may use the input from the input module 104 to determine whether to place the computing device 100 and/or components of the computing device 100 into a low-power state and/or whether to lockout a user from using the computing device 100. The controller 102 may, for example, receive indications as to whether input has been received by the computing device 100 via the input module 104.

The input module 104 may serve as an interface to a user and/or other computing devices for receiving input by the computing device 100. The input module 104 may allow the computing device 100 to receive input from outside the computing device 100. The input module 104 may include, for example, a human interface device ("HID") (e.g., a keyboard, a mouse, a touch screen, or a microphone) or a network interface device for communication to other computing devices (e.g., a modem, a network interface card ("NIC"), a router, a port, etc.). The input module 104 may provide a signal to the controller 102 indicating that the input module 104 has received an input, allowing the controller 102 to determine when the computing device 100 received a last input. In one implementation, the input module 104 may provide signals to the controller 102 only to indicate that a human input from an HID has been received. In another implementation, the input module 104 may provide signals to the controller 102 to indicate that a non-human input (e.g., a signal received from another computing device) has been received.

The computing device 100 may also include a clock 106 or timer. The clock 106 may maintain a current time within the computing device 100. The current time maintained by the clock 106 may correspond to a universal or actual time (such as Pacific Standard Time), or may simply serve as a reference time for time measurements made within the computing device 100. The clock 106 may provide the current time to the controller 102, and/or to other components or modules within the computing device 100.

The controller 102 may store the current time received from the clock 106 at which the controller 102 received a last input from the input module 104. The controller 102 may, for example, write over the most recent time received from the clock 106 each time the controller 102 receives an input from the input module 104.

The controller 102 may control whether one or more components of the computing device 100 (e.g., a processor 108, an output module 114, etc.) receives or consumes power, how much power the component(s) receives or consumes, and/or whether the component(s) executes instructions. The controller 102 may, for example, place the computing device 100 into a low-power state by removing power from the component(s), and/or instructing the component(s) to consume less power.

The processor 108, which may include any processor capable of executing instructions, such as instructions stored in a main memory 110 or cache, and/or providing signals to other components or modules of the computing device 100. The controller 102 may include electrical circuitry and/or may include executable instructions (which may be, for example, part of an operating system running on the computing device 100) that are executed by one or more processors of the device 102. While the controller 102 is shown in FIG. 1 as a separate module within the computing device 100, the controller 102 may also be a component of the processor 108, and/or may be embodied in the processor 108 and/or the memory device's main memory 110, ROM 112, as software or firmware.

The computing device 100 may include the main memory 110, which may include, for example, volatile memory such as static random access memory (SRAM) or dynamic random access memory (DRAM), or any type of memory capable of providing instructions to and/or storing data generated by the processor 108. The main memory 110 may store the time of the last input based on instruction by the controller 102. In one implementation, when the computing device 100 is in a low-power state, such as a Standby, Sleep, or Suspend to RAM state, the main memory 110 stores states or data used by running programs, processes, and threads executed by the processor 108. For example, in a low-power state such as a suspend-to-RAM state, the main memory 110 may remain powered on and may store the data that is used by the processor 108 before entering the suspend-to-RAM state. The main memory 110 may remain powered on during the low-power state, and upon exiting the low-power state, the main memory 110 may provide the data or states back to the processor 108 for execution by the processor 108. The processor 108 may then resume where it left off before entering the low-power state, according to an example embodiment.

The computing device 100 may also include a non-volatile memory 112. The non-volatile memory 112 may include, for example, a magnetic disk, hard disk, flash memory, or other device capable of storing data without consuming power. The non-volatile memory 112 may also be used to store the data when the computing device 100 enters a low-power state, such as a Hibernate, Deep Sleep, or Suspend to Disk state. The non-volatile memory 112 may serve as a backup to the main memory 110, such that upon exiting the low-power state the data can be copied from the non-volatile memory 112 to RAM or main memory 110, then allowing the processor 108 to resume operations using the data that has been copied from the non-volatile memory 112 to the RAM or main memory 110.

Figure 2A:
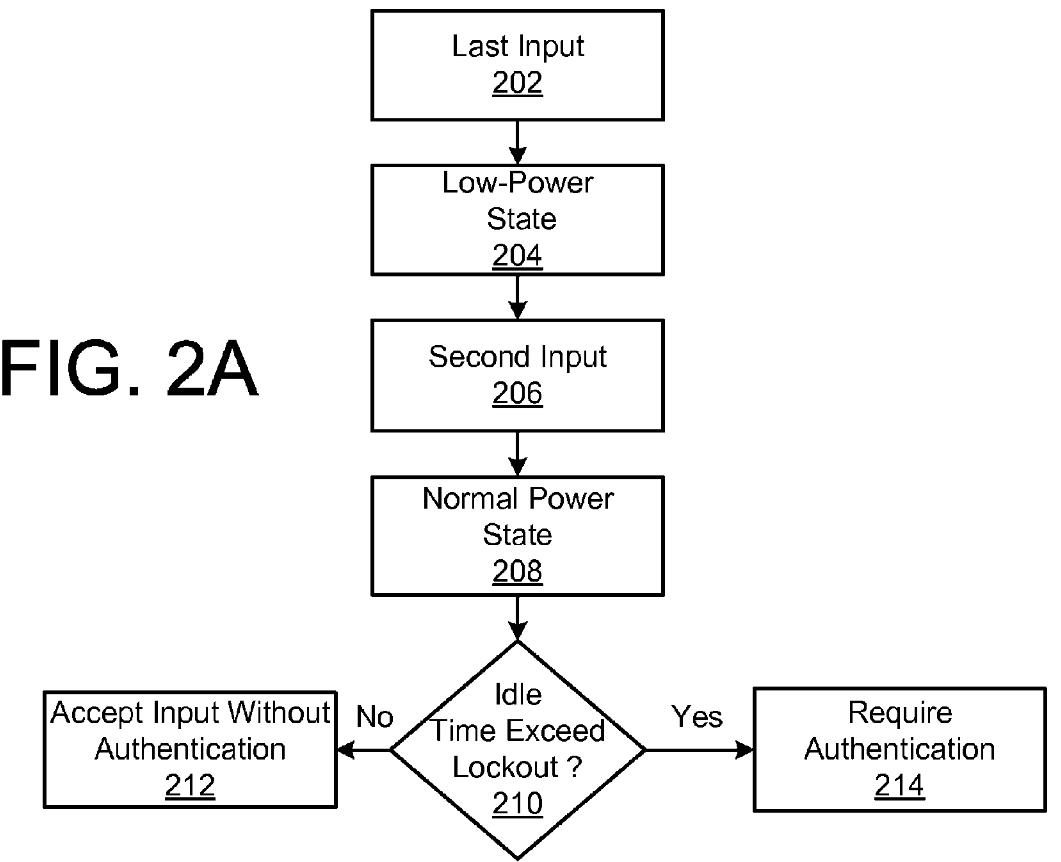
FIG. 2A is a flowchart of processes performed by, and states entered into, the computing device according to an example embodiment.

FIG. 2A is a flowchart of processes performed by, and states entered into, the computing device 100 according to an example embodiment. In this example, the computing device 100 may receive the last input (202). In one implementation, the last input (202) can be a human input, for example, a keystroke or mouse movement, or a touch to the screen, by a user, into the input module 104. In another implementation, that last input can be an input to the controller 102 signifying or indicating that a process or application has completed, or may be data received by the computing device 100 from another computing device. The controller 102 of the computing device 100 may store the time of the last input, and may write over the stored time each time another last input is received.

The controller 102 and/or processor 108 of the computing device 100 may determine an idle time, such as by subtracting or comparing the time of the last input (202) to the current time, which may be provided by the clock 106. After the idle time of the computing device 100 has met or exceeded the power-save time threshold value, the computing device 100 may enter a low-power state (204).

Entering the low-power state (204) may include powering off the processor 108, or reducing total power consumption of the computing device 110 by a significant factor such as five or ten, instructing the processor 108 to stop executing instructions, reducing power to (and/or powering off) the output module 114, and/or entering a Standby, Sleep, or suspend-to-RAM state. The computing device 100 may consume less power during the low-power state (204) than previously consumed during the normal power state such as by a factor of at least five or ten.

The computing device 100 may invoke a screen locker after the low power threshold time has been exceeded and after a lockout threshold time 222 has been exceeded. Invoking the screen locker after the low power threshold time has been exceeded may include setting a field in main memory 110 and/or the non-volatile memory 112 to indicate that the computing device 100 should require authentication after exiting the low-power state. In an example in which the output module 114 continues to provide output in a display while the computing device 100 is in the low-power state (204), the display of the output module 114 may show, after the lockout threshold time 222 has been met or exceeded, an invoked screen locker similar to that shown in FIG. 3. In another example, the display of the output module 114 may turn off when the computing device 100 is in the low-power state (204), and the display of the output module 114 may show the invoked screen locker only upon being woken up form the low power state and returning to the normal power state 208 and only if the lockout threshold time 222 has been met or exceeded.

While in the low-power state 204, the computing device 100 may receive a second input (206). The second input (206) may include an input into the input module 104, such as, for example, a keystroke, a mouse movement, a touch to a touch screen, or audio input into a microphone. Upon receiving the second input (206), the computing device 100 may be woken up from the low power state and exit the low-power state (204) and/or enter the normal power state (208).

In the normal power state (208), the processor 108 may consume full power and/or may resume executing instructions, and/or the output module 114 may be powered on and provide output. The processor 108 may also receive data and/or states from memory within the computing device 100, such as the main memory 110 and/or ROM 112. In the normal power state (208), the output module 114 may also be powered on (in the example in which the output module had been powered off in the low-power state (204)). In the example in which the output module 114 remained powered on during the low-power state (204), the screen locker may have already been invoked after the computing device 110 entered the low-power state and after the lockout threshold time 222 was exceeded. In the example in which the output module 114 was powered off during the low-power state (204), the screen locker may be invoked upon the computing device's 100 entry into the normal power state (208) and determination that the idle time exceeded the lockout threshold 222. In either example, if the idle time has exceeded the lockout threshold, the computing device 100 can require successful authentication by a user upon exiting the low-power state and/or entering the normal power state (208) before the user is permitted to use the computing device by accessing data and/or applications other than the screen locker.

Once the computing device has been woken from the low-power state and restored to the normal power state (208) in response to receiving a second input from the user, the controller 102 and/or processor 108 of the computing device 100 may check the current time provided by the clock 106, and may determine whether the idle time exceeded the lockout threshold (210). The controller 102 and/or processor 108 may calculate whether the idle time exceeded the lockout threshold value by comparing or subtracting a time of the last input (202) to or from the time of the second input (206), or by adding the time between the last input (202) and entering the low-power state (204) (which time may be the low-power threshold value) to a time between entering the low-power state (204) (which time may be stored in the main memory 110 and/or ROM 112) and the second input (206). If the idle time does not exceed the lockout threshold value, then the computing device 100 may allow the computing device 100 to accept further input from the user and allow the user to use the computing device 100, and access data and/or applications other than the screen locker, without performing an authentication technique (212). Thus, if the idle time does not exceed the threshold, the user may continue using the computing device 100 without performing any authentication technique, and without significant delay in using the computing device 100. If the idle time does exceed the lockout threshold value, then the computing device 100 may require successful authentication by the user (214) before allowing the user to use the computing device. The computing device 100 may require authentication, such as by requiring the user to provide a password and/or provide biometric authentication, such as a fingerprint, an iris scan, or a face scan, or may require authentication by providing input from an electronic or magnetic device, according to various example embodiments.

Figure 2B:
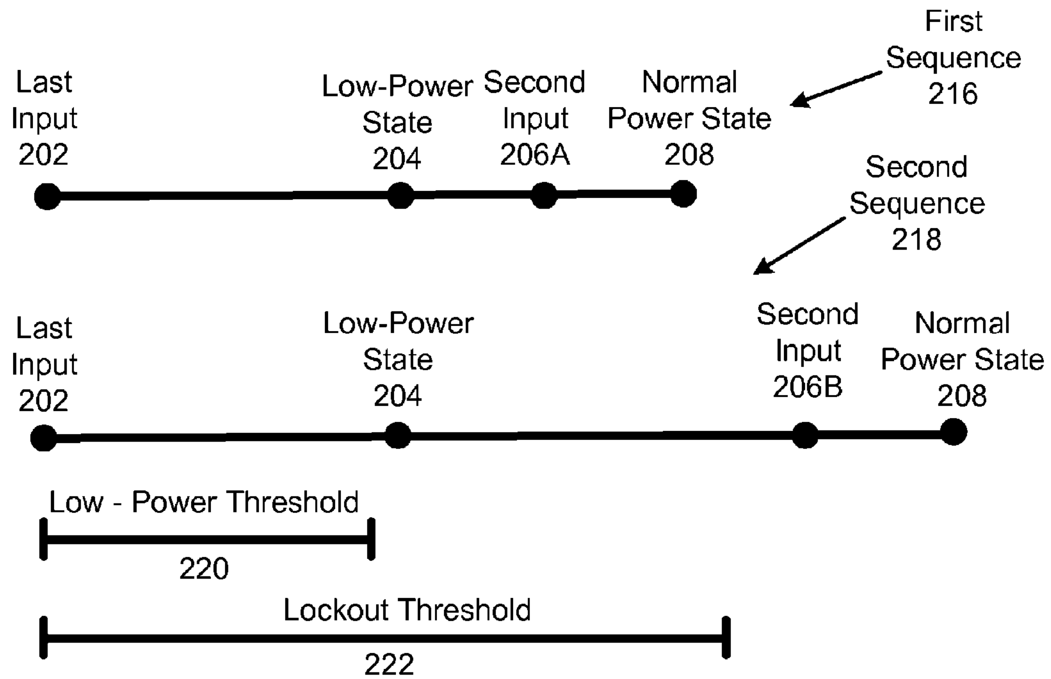
FIG. 2B shows timelines and sequences according to an example embodiment.

FIG. 2B shows timelines and sequences according to an example embodiment. In the first sequence 216, the idle time between the last input 202 and a second input 206A exceeds the low-power threshold 220, but is less than the lockout threshold 222. Thus, in the first sequence 216 example, the computing device 100 will enter the normal power state 208 after receiving the second input 206A and accept further input from the user and will allow the user to use the computing device (by allowing the user to perform tasks other than authentication, such as accessing data and launch and/or uses applications), without authentication by the user after exiting the low-power state 204 and re-entering the normal power state 208.

In the second sequence 218, the idle time between the last input 202 and the second input 206B is greater than both the low-power threshold 220 and the lockout threshold 222. Thus, in the second sequence 218 example, the computing device 100 will require authentication from the user before allowing the user to use the computing device after exiting the low-power state 204 and re-entering the normal power state 208. By requiring authentication, the computing device 100 may prevent the user from providing input into any application or feature of the computing device 100 other than the screen locker. The user may be prevented from providing any input other than authentication, and may not access any data or applications, and may not alter what is outputted by the output module 114. Thus, the screen locker, which requires the user to authenticate himself or herself, may prevent the user from accessing or viewing applications until the user has authenticated himself or herself In the second sequence 218 example, the computing device 100 may invoke a screen locker after entering the low-power state 204 and after the lockout threshold 222 has been met or exceeded. The computing device 100 may, for example, invoke the screen locker while still in the low-power state or upon exiting the low power state. The computing device 100 may, for example, set a bit or field in the main memory 110 to indicate that the screen locker is invoked. The screen locker may serve to prevent a user from utilizing the computing device 100 and/or providing further input without first performing a successful predetermined authentication. The successful predetermined authentication may include, for example, providing a password, or entering a certain input into the computing device 100.

Figure 3:
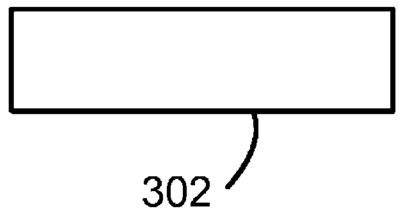
FIG. 3 is a diagram of an output module according to an example embodiment.

FIG. 3 is a diagram showing the output module 114 according to an example embodiment. In this example, the output module 114 may include a visual display, such as a liquid crystal display (LCD), plasma, or cathode ray tube (CRT) monitor. In an example embodiment, the computing device 100 may invoke a screen locker. The computing device 100 may invoke the screen locker in response to the idle time meeting or exceeding the lockout threshold value. Or, the computing device 100 may invoke the screen locker in response to receiving a predetermined input, such as keystrokes such as (ctrl-alt-l) (in which case the computing device 100 may require the user to perform the successful predetermined authentication technique regardless of the idle time). The screen locker may require the user to successfully perform an authentication technique before allowing the user to provide further input to the computing device 100, and/or before accessing some or all of the applications of the computing device 100.

In the example shown in FIG. 3, the computing device 100 may require the user to enter a previously-known password to unlock the screen locker and to access applications of the computing device 100. In this example of a screen locker, the output module 114 requests the user to enter the password, such as displaying, "Please enter your password:", or other text, and presenting a field 302 into which the user may enter the password. In this example, the output module 114 or screen may be considered "locked" because the user may not access some or all features or icons of the output module 114 or screen, such as graphical objects which call applications or functions, until unlocking the screen locker, such as by entering the password. The computing device 100 may allow the user to access some limited number of features or applications of the computing device 100 without first unlocking the screen locker, such as answering incoming phone calls or placing emergency calls in a smartphone computing device, but may deny access to any or all other features or applications.

While the example shown in FIG. 3 requires the user to enter a password to unlock the screen locker, other predetermined authentication techniques may be required to unlock the screen locker. For example, a gesture, such as via a mouse or touch screen input, may authenticate the user, or biometric information, such as a fingerprint, iris scan, or facial scan, or a reading of an electronic device, such as a token key or magnetic strip, may authenticate the user, according to various example embodiments.

In an example embodiment, the computing device 100 may authenticate the user based on an intermediate authentication technique if the idle time meets or exceeds an intermediate threshold value but does not meet or exceed the lockout threshold value. The intermediate threshold value may be greater than the low-power threshold value, but less than the lockout threshold value. Thus, if the idle time is greater than the low-power threshold value, but less than the intermediate threshold value, the computing device 100 may not require the user to perform any authentication technique to resume using the computing device 100; if the idle time is greater than or equal to the intermediate threshold value, but less than or equal to the lockout threshold value, the computing device 100 may allow the user to resume using the computing device after performing either the intermediate authentication technique or the standard authentication technique describe above; if the idle time is equal to or greater than the lockout threshold value, the computing device 100 may allow the user to resume using the computing device 100 only after performing the standard (or second) predetermined authentication technique.

The predetermined intermediate authentication technique may include, for example, a predetermined gesture input into a touch screen (or input module 114) of the computing device 100, or a predetermined pattern of mouse movement inputted into the input module 104 of the computing device 100. The intermediate authentication technique may be less secure than the standard authentication technique, but may provide sufficient security when the computing device has been idle for the intermediate threshold value amount of time but not the lockout threshold value amount of time. The second authentication technique may include, for example, entry of an alphanumeric password.

Figure 4:
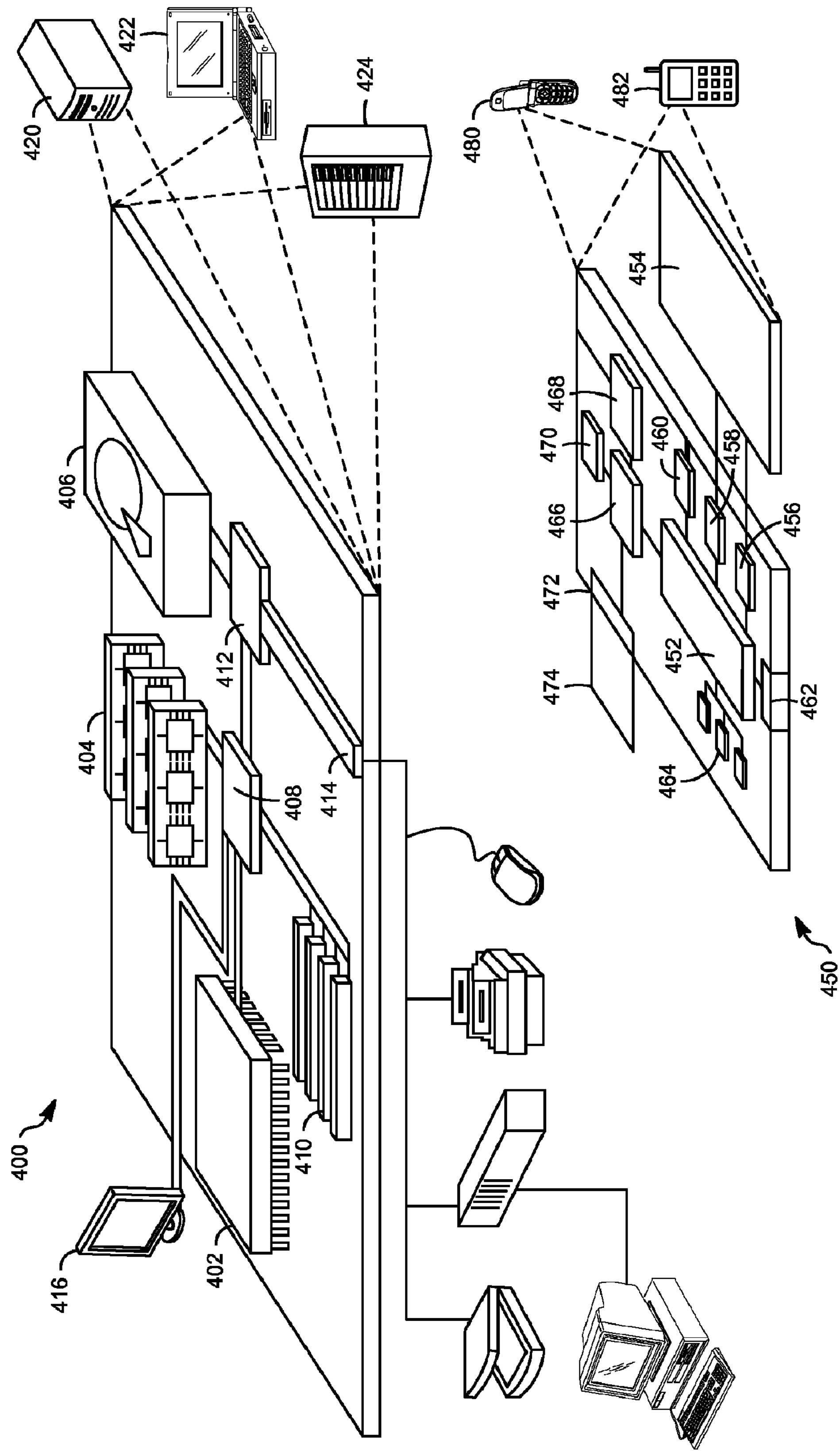
FIG. 4 is a block diagram showing example or representative computing devices and associated elements that may be used to implement the systems and methods of FIGS. 1-3.

FIG. 4 is a block diagram showing example or representative computing devices and associated elements that may be used to implement the systems and methods of FIGS. 1-3. FIG. 4 shows an example of a generic computer device 400 and a generic mobile computer device 450, which may be used with the techniques described here. Computing device 400 is intended to represent various forms of digital computers, such as laptops, netbooks, notebooks, desktops, workstations, personal digital assistants, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in FIG. 4. For example, it may be implemented as a cellular telephone 480. It may also be implemented as part of a smart phone 482, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:

in response to an idle time of a computing device meeting or exceeding a power-save time threshold value, placing the computing device into a low-power state;

in response to receiving an input to the computing device after the computing device has been placed into the low-power state, exiting the low-power state;

after having exited from the low-power state, if the idle time meets or exceeds a lockout threshold value that is greater than both the power-save time threshold value and an intermediate threshold value, requiring a user to perform a first predetermined authentication technique to the computing device before allowing the user to access applications in the computing device;

after having exited from the low-power state, if the idle time meets or exceeds the intermediate threshold value that is greater than the power-save time threshold value and less than the lockout threshold value, but does not meet or exceed the lockout threshold value, requiring the user to perform either the first predetermined authentication technique or a second predetermined authentication technique before allowing the user to access applications in the computing device; and if the idle time does not meet or exceed the intermediate threshold value or the lockout threshold value, allowing the user to access applications in the computing device without requiring the user to perform either the first predetermined authentication technique or the second predetermined authentication technique to the computing device.

2. The method of claim 1, wherein the idle time is a time since a last input to the computing device.

3. The method of claim 1, wherein the idle time is a time since reception of last data to the computing device from another computing device.

4. The method of claim 1, wherein the idle time is a time since a last human interface device input to the computing device.

5. The method of claim 1, wherein the idle time is a time since an indication to the computing device that an application running on the computing device has completed a process.

6. The method of claim 1, wherein the entering the low-power state comprises powering off a processor of the computing device and the exiting the low-power state comprises powering on the processor.

7. The method of claim 1, wherein the entering the low-power state comprises reducing an average total power consumption of the computing device by a factor of at least five.

8. The method of claim 1, wherein the entering the low-power state comprises instructing a processor to stop executing instructions.

9. The method of claim 1, wherein the low-power state comprises a suspend-to-RAM state.

10. The method of claim 1, further comprising:

invoking a screen locker after the idle time exceeds the power-save time threshold value; and wherein allowing the user to access applications without requiring the user to perform either the first predetermined authentication technique or the second predetermined authentication technique comprises unlocking the screen locker without requiring the user to perform either the first predetermined authentication technique or the second predetermined authentication technique.

11. The method of claim 1, wherein the first authentication technique is based on receipt of a predetermined gesture input to the computing device, and wherein the second authentication technique is based on an entry of an alphanumeric password.

12. A computing device comprising:

a clock configured to maintain a current time and provide the current time to other modules in the computing device;

a user input module configured to receive input from a user;

a memory configured to store data, instructions executable by a processor, and states of the computing device;

the processor configured to execute the instructions stored on the memory; and a controller configured to:

place the computing device into a low-power state in response to an idle time meeting or exceeding a power-save time threshold value;

remove the computing device from the low-power state in response to the user input module receiving input after entering the low-power state;

if the idle time meets or exceeds a lockout threshold value that is greater than both the power-save time threshold value and an intermediate threshold value, require the user to perform a first predetermined authentication technique to the computing device before allowing the user to access applications in the computing device;

if the idle time meets or exceeds the intermediate threshold value that is greater than the power-save time threshold value and less than the lockout threshold value, but does not meet or exceed the lockout threshold value, require the user to perform either the first predetermined authentication technique or a second predetermined authentication technique to the computing device before allowing the user to access applications in the computing device; and if the idle time does not meet or exceed the intermediate threshold value or the lockout threshold value, allow the user to access applications in the computing device without requiring the user to perform either the first or second predetermined authentication technique to the computing device.

13. The computing device of claim 12, wherein the idle time is based on a difference between the current time received from the clock and a last input time, the last input time being a time received from the clock when a last input was received by the computing device.

14. The computing device of claim 12, wherein:

the idle time is based on a difference between the current time received from the clock and a last input time, the last input time being a time received from the clock when a last input was received by the computing device; and the last input comprises a human interface device input to the computing device.

15. The computing device of claim 12, wherein:

the idle time is based on a difference between the current time received from the clock and a last input time, the last input time being a time received from the clock when a last input was received by the computing device; and the last input to the computing device comprises an indication from the processor to the controller that an application running on the processor has completed a process.

16. The computing device of claim 12, wherein:

the idle time is based on a difference between the current time received from the clock and a last input time, the last input time being a time received from the clock when a last input was received by the computing device; and the last input to the computing device comprises a reception of last data received by the computing device from another computing device.

17. The computing device of claim 12, wherein the memory is configured to store the time of the last input based on receiving the current time from the clock.

18. The computing device of claim 12, wherein the memory comprises volatile memory.

19. The computing device of claim 12, further comprising:

an output module configured to provide output to the user based on instructions from the processor;

wherein the controller is configured to power down the output module based on the idle time meeting or exceeding the power-save time threshold value.

20. The computing device of claim 12, wherein the controller is configured to place the computing device into the low-power state by powering off the processor and remove the computing device from the low-power state by powering on the processor.

21. The computing device of claim 12, wherein the controller is configured to place the computing device into the low-power state by reducing a power consumption of the computing device by a factor of at least five.

22. The computing device of claim 12, wherein the controller is configured to place the computing device into the low-power state by instructing the processor to stop executing instructions.

23. The computing device of claim 12, wherein the low-power state comprises a suspend-to-RAM state.

24. A non-transitory, computer readable storage medium comprising computer executable code stored thereon that, when executed by at least one processor, is configured to cause a computing device to at least:

in response to an idle time of the computing device meeting or exceeding a power-save time threshold value, place the computing device into a low-power state;

in response to receiving an input to the computing device after the computing device has been placed into the low-power state, exit the low-power state;

after having exited from the low-power state, if the idle time meets or exceeds a lockout threshold value that is greater than both the power-save time threshold value and an intermediate threshold value, require a user to perform a first predetermined authentication technique to the computing device before allowing the user to access applications in the computing device;

after having exited from the low-power state, if the idle time meets or exceeds the intermediate threshold value that is greater than the power-save time threshold value and less than the lockout threshold value, but does not meet or exceed the lockout threshold value, require the user to perform either the first predetermined authentication technique or a second predetermined authentication technique before allowing the user to access applications in the computing device; and if the idle time does not meet or exceed the intermediate threshold value or the lockout threshold value, allow the user to access applications in the computing device without requiring the user to perform either the first predetermined authentication technique or the second predetermined authentication technique to the computing device.

25. The storage medium of claim 24, wherein the idle time is a time since a last input to the computing device.

26. The storage medium of claim 24, wherein the idle time is a time since receiving a human interface device input to the computing device.

27. The storage medium of claim 24, wherein the idle time is a time since receiving an indication to the computing device that an application running on the computing device has completed a process.

28. The storage medium of claim 24, wherein the idle time is a time since reception of last data by the computing device from another computing device.

29. The storage medium of claim 24, wherein the entering the low-power state comprises powering off a processor and the exiting the low-power state comprises powering on the processor.

* * * * *